United States Patent
Spyche, Jr. et al.

(10) Patent No.: US 7,108,111 B2
(45) Date of Patent: Sep. 19, 2006

(54) SEMI-ACTIVE ISOLATOR

(75) Inventors: Gerald J. Spyche, Jr., South Wales, NY (US); Kenichi Tomita, Williamsville, NY (US)

(73) Assignee: Enidine Incorporated, Orchard Park, NY (US)

( * ) Notice: Subject to any disclaimer, the term of this patent is extended or adjusted under 35 U.S.C. 154(b) by 82 days.

(21) Appl. No.: 10/972,709

(22) Filed: Oct. 25, 2004

(65) Prior Publication Data

US 2006/0086582 A1 Apr. 27, 2006

(51) Int. Cl.
*F16F 9/18* (2006.01)
(52) U.S. Cl. ...................................... 188/378
(58) Field of Classification Search ........ 188/378–380; 267/136; 248/550–562
See application file for complete search history.

(56) References Cited

U.S. PATENT DOCUMENTS

| | | | | |
|---|---|---|---|---|
| 2,670,200 A * | 2/1954 | Seddon | ........................ | 267/293 |
| 3,537,696 A * | 11/1970 | Webster, Jr. | ................. | 267/293 |
| 4,475,722 A * | 10/1984 | Paton et al. | ................. | 267/202 |
| 4,521,002 A * | 6/1985 | Adorjan et al. | ............. | 267/221 |
| 4,887,699 A * | 12/1989 | Ivers et al. | .................. | 188/378 |
| 5,265,704 A * | 11/1993 | Landesfeind | ................. | 188/378 |
| 5,526,609 A | 6/1996 | Lee et al. | | |
| 5,765,313 A | 6/1998 | Lee et al. | | |
| 5,803,213 A * | 9/1998 | Davis et al. | ................. | 188/378 |
| 6,098,966 A * | 8/2000 | Latvis et al. | ................... | 267/34 |
| 6,324,794 B1 | 12/2001 | Clinard et al. | | |
| 6,467,748 B1 * | 10/2002 | Schick et al. | ............... | 248/550 |
| 6,530,563 B1 | 3/2003 | Miller et al. | | |
| 6,752,250 B1 * | 6/2004 | Tanner | ........................ | 188/267 |
| 2002/0038929 A1 * | 4/2002 | Now | .......................... | 267/217 |

FOREIGN PATENT DOCUMENTS

JP 56-83633 * 8/1981

* cited by examiner

*Primary Examiner*—Christopher P. Schwartz
(74) *Attorney, Agent, or Firm*—Peter J. Bilinski

(57) ABSTRACT

A shock and vibration isolator that includes a double acting mechanical spring assembly that is mounted to act in parallel with a fluid or liquid spring assembly. The mechanical spring is arranged to provide a first spring rate over a first displacement range and a second spring rate over a further second displacement range. The liquid spring is connected to an accumulator by control circuitry that is under the control of a microprocessor to release stored energy which combines with that of the mechanical spring to rapidly dissipate the input G forces to a level sufficient to protect a substructure.

12 Claims, 6 Drawing Sheets

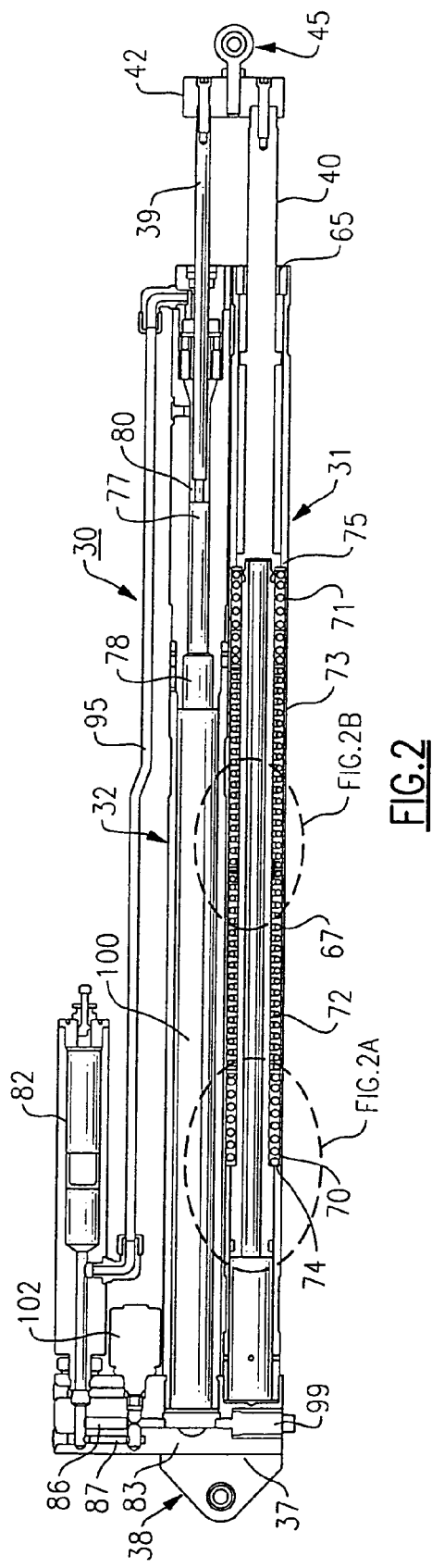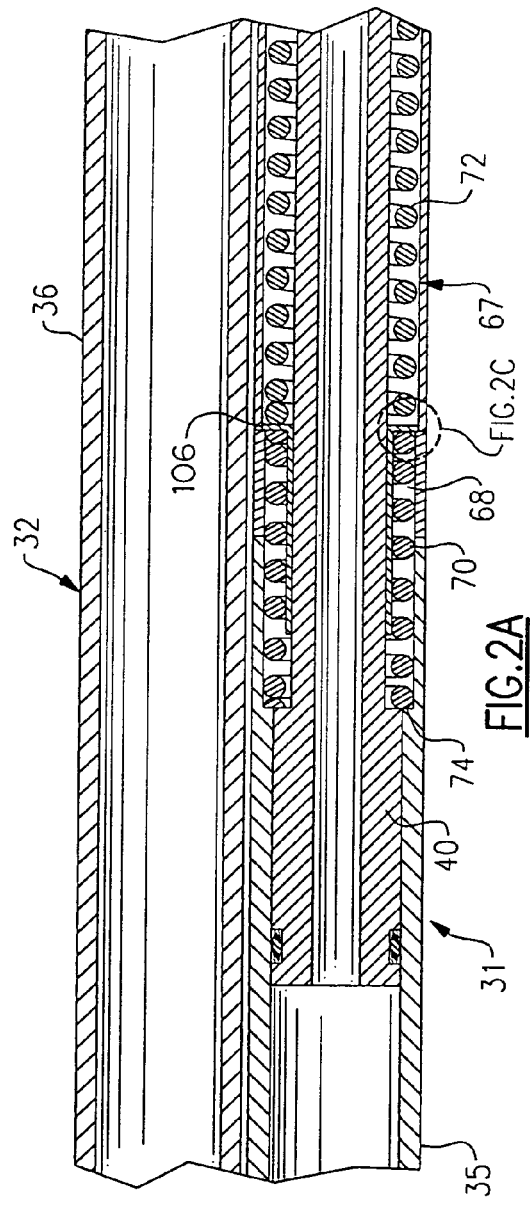

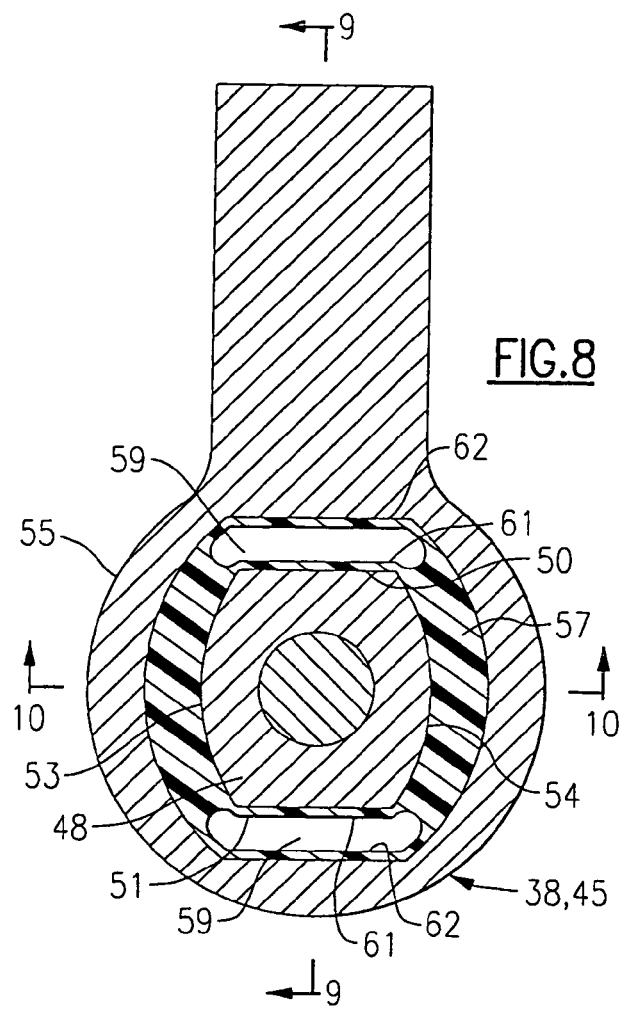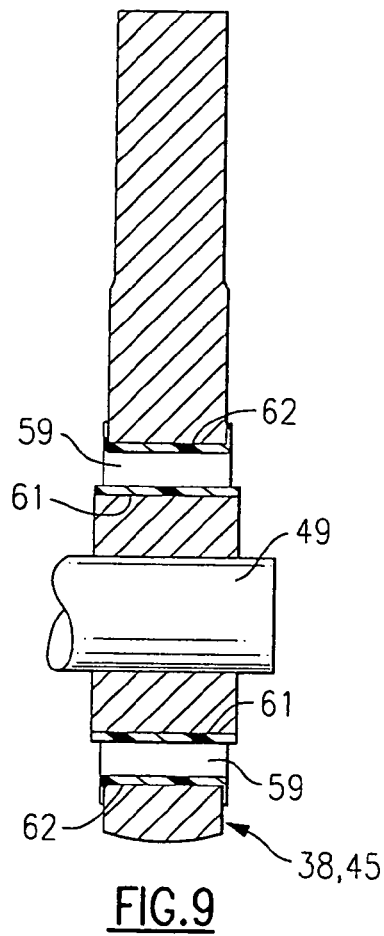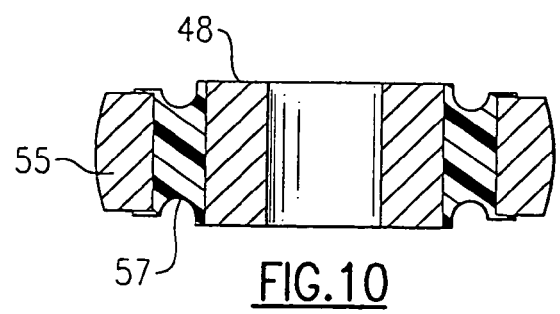

SEMI-ACTIVE ISOLATOR

STATEMENT REGARDING FEDERALLY SPONSORED RESEARCH

This invention was made with Government support under contract Number N00167-01-D-0063 awarded by the Naval Surface Warfare Center Carderock Division.

FIELD OF THE INVENTION

This invention relates to a shock isolator that is ideally suited for protecting a substructure containing sensitive instruments which is contained within a main structure such as a building or the like from the potential harmful effect associated with vibratory or shock energy.

BACKGROUND OF THE INVENTION

In U.S. Pat. Nos. 5,526,609 and 5,765,313 to Lee et al. there is disclosed method and apparatus for effecting a real time structural parameter modification (RSPM) for protecting a structure such as a high rise building or the like from the harmful effects of an earthquake or high winds. In this type of system a series of fluid springs are coupled to the structure at key locations by hydraulic switches. When a switch is activated by high external forces the spring engages an element of the structure that is being deflected so as to stiffen the element. Energy is thus stored in the spring and is later released from the system when the spring is disengaged from the structural element. In the RSPM system the element is released when its deflection reaches a zero velocity. The element is again engaged as it deflects in the opposite direction.

A fluid spring unit for protecting a substructural element from the harmful effects of a cyclic event is disclosed in U.S. Pat. No. 6,324,794. The unit is contained within a main structure and includes a housing containing a fluid filled cavity that is separated into two chambers by a piston that is slidably mounted within the cavity. The housing is attached to one of the structures and the piston is connected to the substructure by a piston rod. The fluid spring is placed in fluid flow communication with a pressurized accumulator tank by a control circuit that is under the control of a microprocessor. A sensor monitors the pressure in the spring chamber. At the outset of a cyclic event the fluid in the chamber is permitted to store energy until the chamber pressure reaches a given level whereupon a control valve is opened allowing the high pressure fluid in the spring chamber to pass into the accumulator tank where its energy is dissipated rapidly in the form of heat.

Although these prior art devices work well in isolating structures from the harmful effects of a cyclic event, their response times are relatively slow and the amount of energy that can be absorbed is limited by the amount of space that is available for mounting the system components.

SUMMARY OF THE INVENTION

It is therefore a primary object of the present invention to improve systems for protecting structure from the potentially harmful effects of a cyclic event such as earthquakes, excessively high wind loads and the like.

It is a further object of the present invention to improve the response time of apparatus for isolating the harmful effects of shock or vibratory forces upon a structure.

It is another object of the present invention to provide a compact shock isolator that can be accommodated within a relatively confined space.

A still further object of the present invention is to provide a shock absorption system that has all the combined advantages of a mechanical spring and a liquid spring.

Yet another object of the present invention is to provide a shock isolator that exhibits a first spring rate over a first displacement range and at least a second spring rate over a second displacement range.

These and other objects of the invention are attained by a shock isolator for protecting a substructure mounted within a main structure that is subjected to potentially harmful effects of a cyclic event. The isolator includes a double acting mechanical spring assembly that is mounted in parallel with a liquid spring assembly so that the two units act in concert between the main structure and the substructure to absorb the energy produced by shock or vibratory forces acting upon the main structure. In one embodiment of the invention, the mechanical spring is arranged to provide an initially high spring rate over a first displacement range and a second lower spring rate thereafter. The liquid spring is connected to an accumulator by means of flow control circuitry that is controlled by a microprocessor to produce a given spring rate which combines with that of the mechanical spring assembly to rapidly absorb sufficient vibratory or shock energy to protect the substructure from high G loads.

BRIEF DESCRIPTION OF THE DRAWING

For a further understanding of these and objects of the present invention, reference shall be made to the following detailed description of the invention which is to be read in connection with the accompanying drawings, wherein:

FIG. 2 is a side elevation in section of the isolator of the present invention showing a mechanical spring assembly mounted in parallel with a liquid spring assembly;

FIG. 2A is an enlarged partial view in section showing an end section of the spring array that is contained within the mechanical spring assembly;

FIG. 2C is a partial enlarged view in section illustrating the flanged cylinder separating the springs of the mechanical spring array;

FIG. 8 is a partial front view in section of an isolator connector for attaching the isolator between the inner and outer frames of the cabinet;

FIG. 9 is a side view in section of the connector; and

FIG. 10 is a sectional view through the connector that is taken along line 10—10 in FIG. 8.

DETAILED DESCRIPTION OF THE INVENTION

Figure 1:
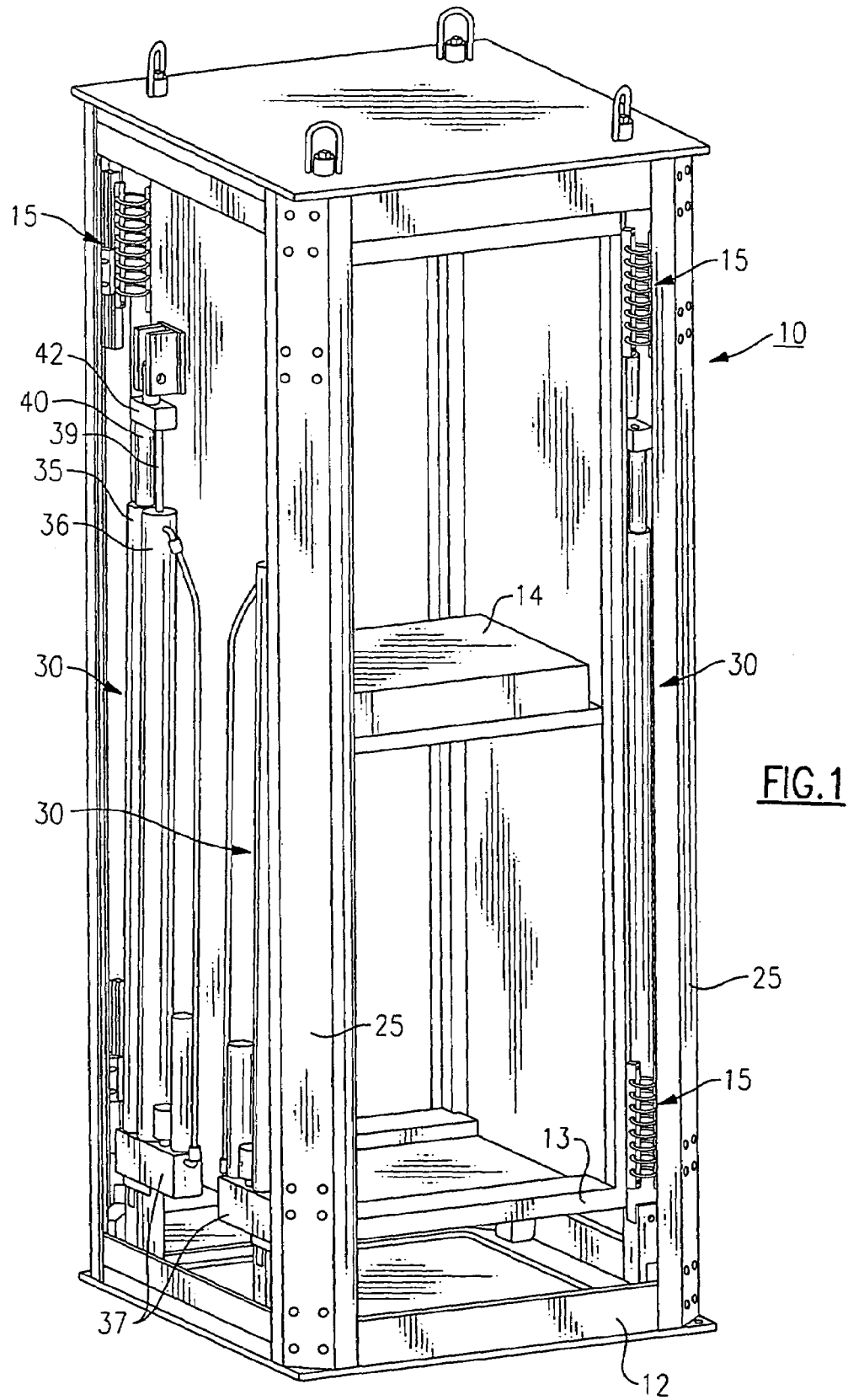
FIG. 1 is a perspective view of an instrument cabinet employing an isolator embodying the teaching of the present invention for supporting an inner frame within a rigid outer frame of the cabinet.

The present invention will be described with reference to a cabinet 10 for protecting sensitive instruments, as for example a computer 14, from the harmful effects of a cyclic event such as shock, vibration and the like. The cabinet contains an outer frame 12 that is rigidly affixed to a ground such as a building that is exposed to seismic like induced forces of a cyclic nature that are capable of producing high G loads on the structure. The cabinet also includes an inner frame 13 that is suspended within the outer frame by means of a series of wire rope isolators, generally referenced 15, and a number of double acting shock isolators, generally referenced 30, that employ the teachings of the present invention. The wire rope isolators and the shock isolators act in concert to reduce the G load acting upon the inner frame to a level whereby the instrument housed within the inner frame is not harmed and will continue to function during periods when the main structure is experiencing high G loads.

Figure 3:
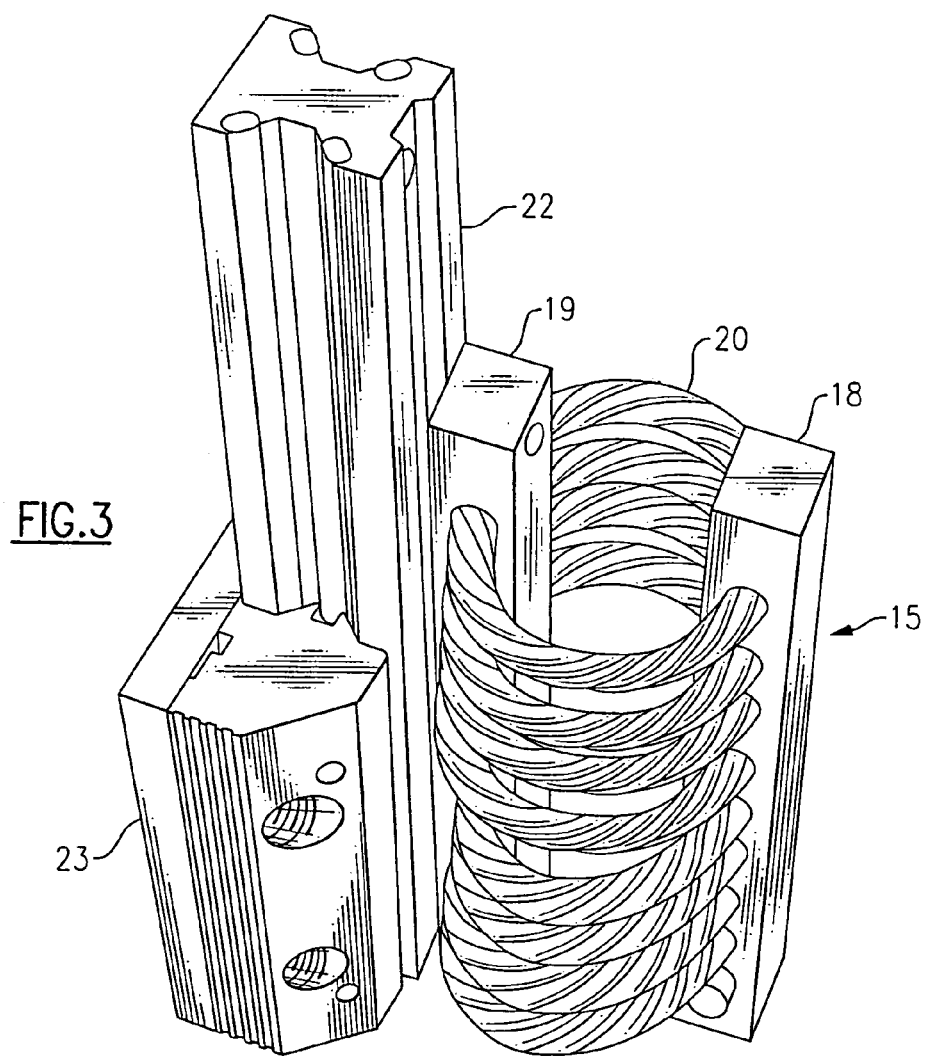
FIG. 3 is an enlarged perspective view of a wire rope isolator which is used to help support the inner frame within the outer frame of the cabinet.

With further reference to FIG. 3, each wire rope isolator includes a pair of parallel spaced apart metal blocks 18 and 19 that are cojoined by a wire rope 20 that is threaded through the blocks as illustrated. The turns of the wire rope are secured to each block by mechanical crimping the block material against the wire rope. Other means for securing the wire rope to the blocks are known and used in the art and can include screws, spot welds and mechanical wedges. Block 19 of each wire rope isolator is secured to a slide 22 which is slidably contained within a vertically disposed guideway 23. As illustrated in FIG. 1, the guideway is secured to a corner plate 25 that forms part of the outer frames skeleton.

Both the inner and outer frames of the cabinet are rectangular shaped with each side of each frame being perpendicular with regard to a neighboring side. One of the corner plates 25 is located at each of the outer frame corners and extends vertically along the full length of the corner. In assembly, each corner plate forms a 45° angle with the two sides of the outer frame that forms the corner. Block 18 of the wire rope isolator, in turn, is securely affixed to an adjacent corner of the inner frame by any suitable means. As illustrated in FIG. 1, a wire rope isolator is located at both the top section and the bottom sections of each inner frame corner whereby the inner frame of the cabinet is contained within the outer frame with the weight of the inner cabinet being supported by the double acting shock isolators 30. Accordingly, any high shock or vibratory forces acting upon the cabinet in a direction other than a vertical direction will cause the wire rope isolator to deflect thereby attenuating the effect of these forces on the inner frame. Each wire rope isolator is allowed to move vertically within the guideway 23 and thus have little ability to attenuate forces acting in a vertical direction. This decouples the inner and outer frames and allows for vertical motion relative to the two frames. A wire rope isolator suitable for use in the present embodiment of this invention is described in greater detail in U.S. Pat. No. 5,549,285, the disclosure of which is incorporated herein by reference.

Figure 2B:
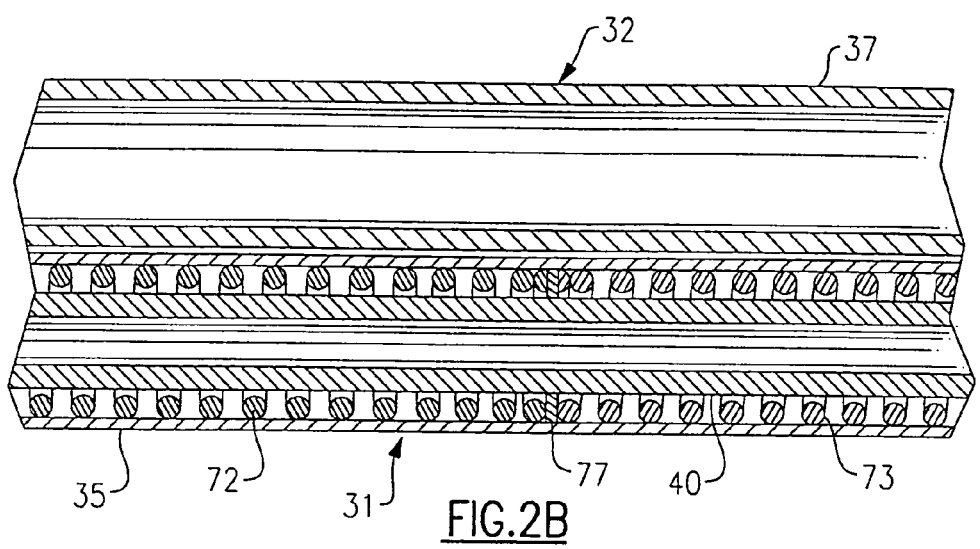
FIG. 2B is an enlarged partial view in section showing the center section of the spring array.

Four shock and vibration isolation units 30 are arranged to act between the inner and outer frames of the instrument cabinet. Each unit includes a mechanical spring assembly 31 and a fluid spring assembly 32 (FIG. 2) that are vertically mounted in a side by side relationship between the two frames. The mechanical spring assembly is contained within a cylindrical sleeve 35 while the fluid spring is contained within a cylindrical fluid tight housing 36. The lower section of each housing is secured to a base 37 which in turn, is affixed to the lower part of the outer frame of the cabinet by a first connector 38. A piston rod 39 extends upwardly from the upper end of the liquid spring assembly in parallel alignment with an elongated linear arm 40 that passes upwardly from the upper end of the mechanical spring assembly. The piston rod of the liquid spring and the linear arm of the mechanical spring are tied together by a common yoke 42. The yoke, in turn, is attached to the inner frame by second connector 45. As will be explained in greater detail below, the piston rod and the elongated arm are forced to move together in unison as the shock and vibration isolator unit is stroked in a vertical direction.

The two end connectors 38 and 45 are of similar construction. A metal collar 48 is press fitted into a pinion 49 that attaches each end connector to one of the frames. The collar contains a flat top surface 50 and a parallel flat bottom surface 51 that are connected by circular side wall 53 and 54. An opening is contained in the bell section 55 of the end connector that complements the shape of the collar. The space between the bell section and the collar is filled with an elastomeric member 57 that is designed to respond to vibrations below a given threshold at which the shock and vibration isolator unit 30 begins to absorb energy. Openings 59 are provided in the elastomeric member 57 adjacent to the opposed flat surfaces 50 and 51 of the collar to establish an air gap in the member so that the opposed surfaces 61 and 62 of the member forming the air gap will close against each other when the break away threshold level is reached. A connector of the type herein described discloses in greater detail in U.S. Pat. No. 6,530,563 B1, which disclosure is incorporated herein by reference.

As noted above, the double acting mechanical spring assembly 31 is contained within a tubular shell 35. The linear arm 40 is slidably mounted in the central bore of the sleeve 65 to establish a close sliding fit between the sleeve and the arm. An array 67 of four coil springs are wound in series about the arm. The spring array resides within a recess 68 that is shared equally between the inner wall of the shell and the outer wall of the arm when the assembly is not moved in either compression or tension. The array includes a pair of outer ends comprising a compression side end spring 70 and a tension side end spring 71 which are spaced apart by two inner springs 72 and 73. When in the neutral position the compression side end spring rests against one end shoulder 74 of the recess and the tension side end spring rests against the opposite shoulder 75 of the recess. The springs are arranged to provide a given preload on the assembly when the assembly is in the neutral or unstressed position.

The two end springs 70 and 71 of the spring array each have a first spring rate and the two inner springs 72 and 73 each have a second spring rate. The spring rate of the end springs is typically higher than that of the inner springs. The preload of the inner springs 72 and 73 is typically much higher than the preload of the end springs 70 and 71. Each outer end spring is separated from the adjacent inner springs by a flanged cylinder 76 that extends inwardly into the recess from the shell and rests on a shoulder 79 formed in the shell, which allows the flanged cylinder 76 to move only towards the inner springs. The depth of penetration of each flanged cylinder is slightly less than the depth of the upper half of the recess which is formed by the shell so that the flanged cylinder will not prevent the shell from moving freely over the linear arm 40. The two inner springs 72 and 73 are separated by a center ring 77.

When the outer frame of the cabinet is exposed to a shock or vibratory input that is greater than the spring preload, the shell is initially driven upwardly over the arm 40 toward the inner frame. As a result, the tension side end spring 71 is compressed between the adjacent flanged cylinder 76 and the shoulder of the recess 106 formed in the sleeve on the tension side of the recess. In this case the tension side of the spring array is on the right side of the isolator illustrated in FIG. 2 and the compression side is on the left side of the isolator. At this time, the compression side end spring remains in its initial preload position captured between the shoulder 106 formed in the upper half of the recess on the compression side of the system and the adjacent compression side flanged cylinder 76.

The tension side end spring 71 having a higher spring rate than the inner springs 72 and 73 is arranged so that it will resist the initial compressive load until the shell has been displaced a first distance toward the tension side of the assembly whereupon the tension side spring has been completely depressed. At this time the softer inner springs 72 and 73 take over the compressive load thereby storing addition energy toward the end of the compression stroke but at a lower rate to considerably reduce the G forces transmitted to the inner frame of the cabinet.

At the end of the compression cycle, the mechanical spring assembly will go into a tension mode of operation as the frames return to the original unstressed positions. As noted above, the mechanical spring assembly is a double acting unit and because the springs in the array are arranged symmetrically about the center of the array, the assembly will respond in the same manner in both the compression and tension modes of operation. Accordingly, at the beginning of the tension mode the compression side end spring 70 will initially provide a stiff resistance to the rebound forces until such time as the end spring is fully compressed whereupon, the softer inner springs 72 and 73 stores the load energy to reduce the G forces acting upon the inner frame.

The liquid spring assembly 32 includes a cylindrical housing 36 that contains a central bore having three chambers having varying diameters. The larger diameter chamber 100 is located at the compression side of the housing and is connected to the small diameter chamber 77 by an intermediate diameter chamber 78. A piston 80 is slidably contained within the smaller diameter chamber 77 and is attached to piston rod 39. The length of the small diameter chamber is slightly greater than the stroke of the mechanical spring assembly thus enabling the two spring assemblies to move together in unison to attenuate the vibratory G forces acting in both directions upon the system. The three chambers are arranged so as to tune the natural frequency of the liquid spring far enough away from that of the inner frame and equipment mass so that the two frequencies cannot combine to produce a deleterious effect upon the system.

Figure 4:
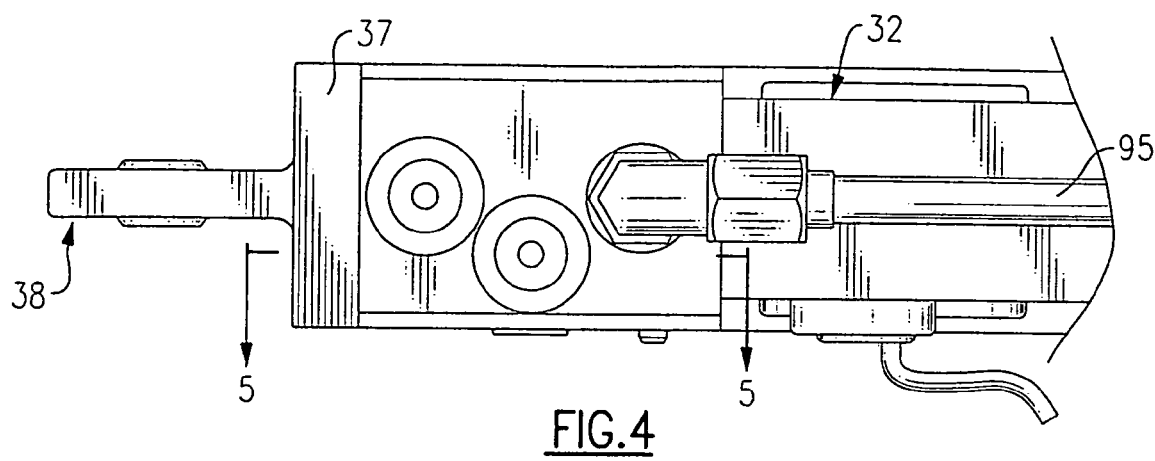
FIG. 4 is an enlarged partial top view showing the bottom end of the isolator.
Figure 5:
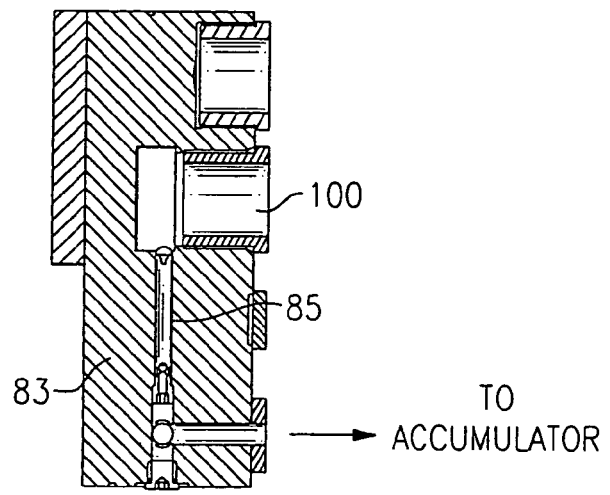
FIG. 5 is a section taken along lines 5—5 in FIG. 4.
Figure 6:
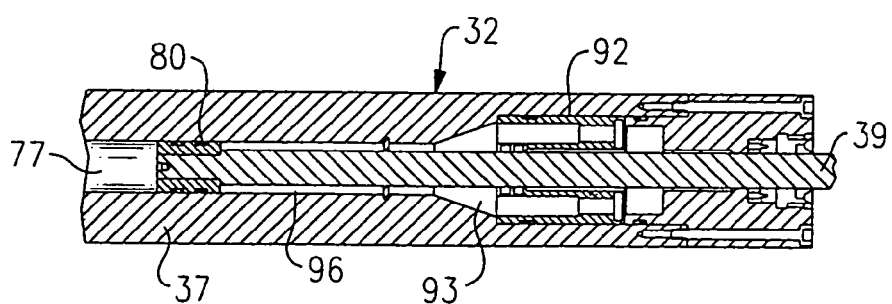
FIG. 6 is an enlarged partial view in section showing the piston and piston rod of the fluid spring.
Figure 7:
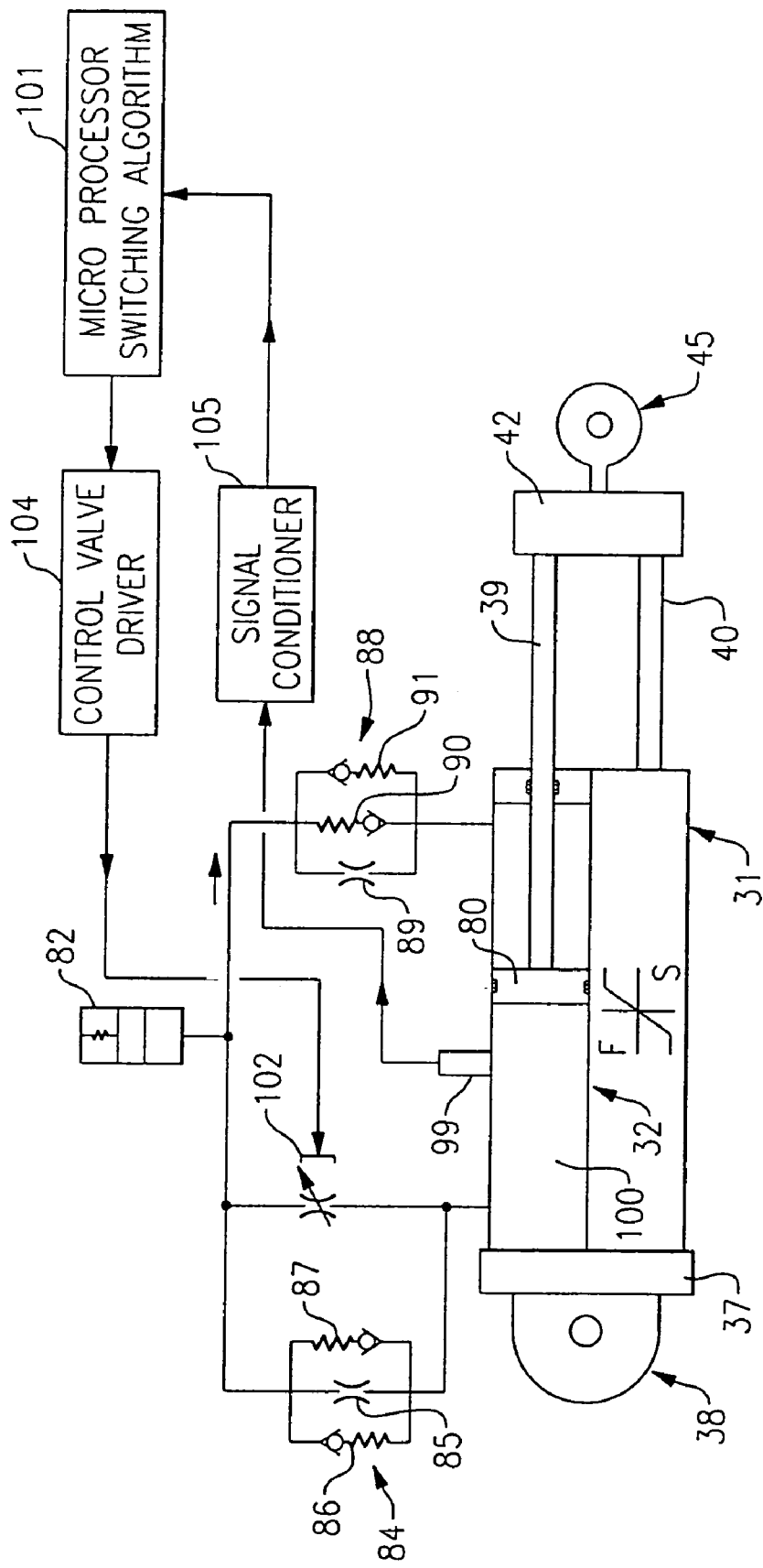
FIG. 7 is a schematic diagram showing the flow control circuitry used in association with the liquid spring assembly.

The function of the liquid spring will be explained in greater detail with further reference to the diagram illustrated in FIG. 7 along with the structure illustrated in FIGS. 4–6. The large diameter chamber 100 on the compression side of the spring housing is connected to an accumulator 82 by means of a manifold 83 that contains a compression side flow control circuit generally referenced 84 (see FIG. 7). The control circuit contains an orifice 85 that is adapted to orifice fluid from chamber 100 back to the accumulator when the pressure in the chamber exceeds a predetermined level during the compression cycle. A refill check valve 86 is placed in parallel over the control orifice and is arranged to open when the fluid pressure in the accumulator exceeds that in the large diameter chamber which occurs when the liquid spring changes from the compression mode of operation over to the tension mode of operation thereby keeping the compression side of the bore filled with fluid during the tension cycle. A relief check valve 87 is also mounted in parallel with the control orifice 85 and the refill check valve 86 and is arranged to open in the event the isolator experiences an exceedingly high input force. Opening the relief valve releases the liquid spring from the system and thus helps to reduce the adverse effect of the exceedingly high input load on the inner frame structure.

The accumulator is also connected to the smaller diameter chamber 77 by a second flow control circuit 88 that includes a flow control orifice 89, a refill check valve 91 and a relief check valve 90. During the tension cycle the flow orifice 89 conveys fluid back from the small diameter chamber 77 to the accumulator when the pressure behind the piston is greater than that in the accumulator. The refill check valve 90, in turn, is arranged to open when the fluid pressure in the accumulator exceeds the fluid pressure behind the piston so that fluid flow into the smaller chamber during the compression mode continues to fill the area behind the piston. The relief check valve 91 again is arranged to open in the event the G loading on the isolator exceeds a given limit thereby completely releasing the liquid spring from the system.

The valve components of the second flow control circuit 88 are mounted in a cartridge 92 that is located in a cavity 93 behind the smaller diameter chamber 77. The cavity is placed in fluid flow communication with the accumulator by a flow line 95 and with the smaller chamber 77 of the fluid spring by means of a conduit 96 (FIG. 6). The piston rod 39 is arranged to move axially in the cartridge and suitable seals are provided to prevent fluid flow passing between the cartridge and the piston rod.

A pressure transducer 99 is mounted in the larger chamber of the fluid spring on the compression side of the piston 80 which measures the pressure in the chamber and transmits a signal indicative of the pressure to a signal conditioner 105. A conditioned output signal is sent from the conditioner to a microprocessor 101 that contains a switching algorithm for controlling a control valve 102 through a control valve driver 104. In response to the algorithm the valve is cycled to maintain a desired pressure on the compression side of the liquid spring and thus limit the G loading on the inner frame during the compression cycle.

While the present invention has been particularly shown and described with reference to the preferred mode as illustrated in the drawing, it will be understood by one skilled in the art that various changes in detail may be effected therein without departing from the spirit and scope of the invention as defined by the claims. For example the number of springs in the spring mechanical array may vary depending upon a particular application to provide two or more spring rates within the stroke range of the isolator. In addition, the end spring may have a lower spring rate than the inner springs without departing from the teachings of the present invention.

We claim:

1. A shock and vibration isolator that includes:
    a double acting mechanical spring assembly that deflects uniformly when placed under compression or tension, said mechanical spring assembly having a first spring rate when displaced over a first displacement range and at least one other second spring rate when deflected over a second displacement range;
    a fluid spring assembly that is mounted in parallel with the mechanical spring assembly to act in either compression or tension, said fluid spring assembly having a housing containing a fluid filled bore and a piston slidably mounted within said bore for dividing said bore into a first compartment and a second compartment; and a first flow control circuit for connecting said first compartment of the bore to an accumulator and a second flow control circuit for connecting said second compartment to said accumulator, wherein each flow control circuit contains a control orifice for exchanging fluid between the accumulator and the bore, wherein said mechanical spring assembly includes a tubular shell that contains an axially aligned array of coil springs that are wound about a linear arm that passes out of one end of said shell, said spring array being arranged to apply a given preload between the linear arm and the shell.

2. The isolator of claim 1 wherein said spring array includes a pair of end springs and one or more inner springs mounted between the end springs.

3. The isolator of claim 2 wherein the end springs have a different spring rate than the one or more inner springs.

4. The isolator of claim 3 wherein said end springs have a higher spring rate than said one or more inner springs.

5. The isolator of claim 4 wherein said spring array contains at least two inner springs.

6. The isolator of claim 1, wherein said piston of said fluid spring assembly contains a piston rod attached to said piston, said piston rod passing out of one end of said housing and is in parallel alignment with said arm of said mechanical spring assembly.

7. The isolator of claim 6 further including a yoke for connecting the extended ends of the piston rod and the linear arm so that the mechanical spring assembly and the fluid spring assembly act in concert when the isolator is placed in either compression or tension.

8. The isolator of claim 7 that further includes a coupling means for connecting the other ends of the shell and the housing to a first structure and the yoke to a second structure.

9. The isolator of claim 1 wherein each of said first and second flow circuits contains a refill check valve that is in parallel with the control orifice and which is arranged to open when the accumulator pressure is higher than in the associated compartment such that the compartment will remain filled with fluid when the fluid spring assembly is placed under a compressive load or a tensile load.

10. The isolator of claim 9 wherein each of said first and second flow control circuits further includes a relief check valve that is in parallel with the flow orifice and refill check valve and which is arranged to open when the pressure in the associated compartment exceeds a given value so as to release the fluid spring assembly from the system in the event the isolator is exposed to an exceedingly high input load.

11. The isolator of claim 10 wherein the fluid spring assembly includes a pressure sensor mounted in one compartment that is arranged to send a pressure indicative control signal through a microprocessor to a control valve that is connected in a flow line that connects the accumulator and said one compartment, said microprocessor containing a control algorithm for cycling the control valve to maintain the pressure in said compartment at a desired level.

12. The isolator of claim 1 wherein the bore of the fluid spring assembly contains a series of compartments each having a different diameter such that the natural frequency of the fluid spring assembly is different from that of a system that is being isolated.

* * * * *